United States Patent [19]

Gutschmidt

[11] 4,345,530
[45] Aug. 24, 1982

[54] INSTALLATION FOR BURNING-OUT SCRAP METAL

[75] Inventor: Peter-Michel Gutschmidt, Tegernsee, Fed. Rep. of Germany

[73] Assignee: Orgatechna Treuhand AG, Ennetbuergen, Switzerland

[21] Appl. No.: 119,175

[22] Filed: Feb. 6, 1980

[30] Foreign Application Priority Data

Feb. 7, 1979 [DE] Fed. Rep. of Germany ....... 2904479

[51] Int. Cl.$^3$ .............................................. F23G 7/00
[52] U.S. Cl. ................................... 110/215; 110/345; 432/266; 432/146
[58] Field of Search ............... 110/215, 210, 211, 255, 110/344–346; 432/266

[56] References Cited

U.S. PATENT DOCUMENTS

| | | | |
|---|---|---|---|
| 3,601,069 | 8/1971 | Mancuso | 110/215 |
| 3,646,897 | 3/1972 | Snelling | 110/345 |
| 3,706,289 | 12/1972 | Brewer | 110/215 |
| 3,745,939 | 7/1973 | Allbritton | 110/215 |
| 3,762,858 | 10/1973 | Torrence | 432/266 |
| 3,917,239 | 11/1975 | Rhinehart | 110/215 |
| 3,995,568 | 12/1976 | Duirka et al. | 110/215 |
| 4,005,981 | 2/1977 | Turnbull | 432/146 |

Primary Examiner—Henry C. Yuen
Attorney, Agent, or Firm—Schwartz, Jeffery, Schwaab, Mack, Blumenthal & Koch

[57] ABSTRACT

Disclosed is an installation for burning-out scrap metal goods for the purpose of reclaiming scrap metal, comprising at least one furnace wagon, which is capable of being loaded with the scrap metal goods to by burned out; at least one burning-out chamber into which the furnace wagon is movable for burning-out the scrap metal goods to produce scrap steel; means for heating the burning-out chamber to a temperature of at least about 600° C.; at least one afterburning chamber communicating with the burning-out chamber for afterburning flue gases produced in the burning-out chamber at a temperature from about 1100° to 1200° C.; a waste gas purifying plant communicating with the afterburning chamber for eliminating the flue gas impurities and for the scrubbing of the flue-gases originating from the afterburning chamber; and at least one cooling chamber arranged adjacent to and in selective communication with the burning-out chamber for cooling the burned-out material.

8 Claims, 3 Drawing Figures

INSTALLATION FOR BURNING-OUT SCRAP METAL

BACKGROUND OF THE INVENTION

The present invention relates to an installation for burning-out scrap metal, for the purpose of reclaiming steel scrap. The operation of such an installation permits the highly profitable production of very good quality scrap metal, in particular, without any sulphur content, even when automobile wrecks are burned-out, without excessive noise, without dangerous waste products, and without air- and water pollution. Thus, it is environmentally sound and extraordinarily economical.

SUMMARY OF THE INVENTION

It is an object of the present invention to provide an improved installation for burning-out scrap metal.

It is another object of the present invention to provide a particularly favorable mode of operation and spacial arrangement of burning-out chambers, afterburning chamber and waste gas purifying plant.

Another object of the invention resides in providing such an installation wherein the space at the charger end in front of the burning-out chambers is utilized with the cooling chambers connected to them, while the waste gas purifying plant can be situated on the opposite side, i.e., at the back of the burning-out chambers.

It is also an object of the invention to provide an installation which is secure against possible explosions.

Still another object of the invention is to provide an installation wherein it is possible to heat the interior of the burning-out chamber as evenly as possible, with the burners being simultaneously maneuverable.

It is furthermore an object of the invention to provide an installation which simplifies the cooling and cleaning of the burnt-out scrap in the cooling chambers.

Another object resides in the provision of an installation which provides for the simple disposal of scrubbing water accumulating in the cooling chambers.

Still another object of the invention involves the provision of an installation wherein a special drive on the furnace wagon, which would have to be protected against heat and moisture, is avoided, by providing that, in the burning-out and/or cooling chambers, only the chain of the chain drive needs to be driven, which passes, if necessary, in a largely uncoverable ground channel.

Finally, it is also an object of the invention to provide an installation in which it is easily possible to drive entire rail wagons into the scrap burning-out installation on their own wheels.

In accomplishing the foregoing objects, there has been provided in accordance with the present invention an installation for burning-out scrap metal goods for the purpose of reclaiming scrap metal, comprising: at least one furnace wagon, which is capable of being loaded with the scrap metal goods to be burned-out; at least one burning-out chamber into which the furnace wagon is movable for burning-out the scrap metal goods to produce scrap steel; means for heating the burning-out chamber to a temperature of at least about 600° C.; at least one afterburning chamber communicating with the burning-out chamber for afterburning flue gases produced in the burning-out chamber at a temperature from about 1100° to 1200° C.; a waste gas purifying plant communicating with the afterburning chamber for eliminating the flue gas impurities and for the scrubbing of the flue-gases originating from the afterburning chamber; and at least one cooling chamber arranged adjacent to and in selective communication with the burning-out chamber for cooling the burned-out material. Preferably, the installation comprises two burning-out chambers, arranged next to each other, wherein the burning-out chambers are attached to a common afterburning chamber and a common waste gas purifying plane. Preferably, each of the heating means in each of the burning-out chambers comprises a plurality of selectively operable burners positioned along the length of the burning-out chambers, and each of the cooling chambers comprises means for cleaning the burned-out material by water spraying as well as a suction device for removing steam.

DETAILED DESCRIPTION OF PREFERRED EMBODIMENTS

Figure 1:
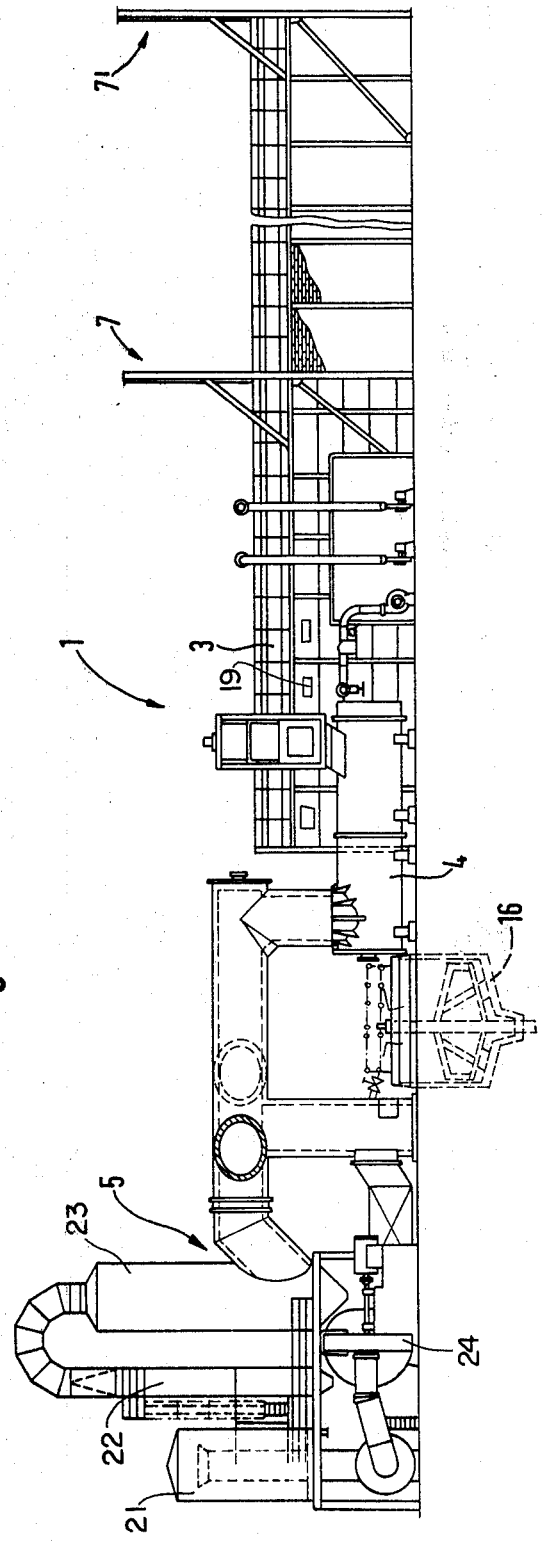
FIG. 1 is a diagrammatic side view of an installation for burning-out scrap metal using the invention (partly broken away)
Figure 2:
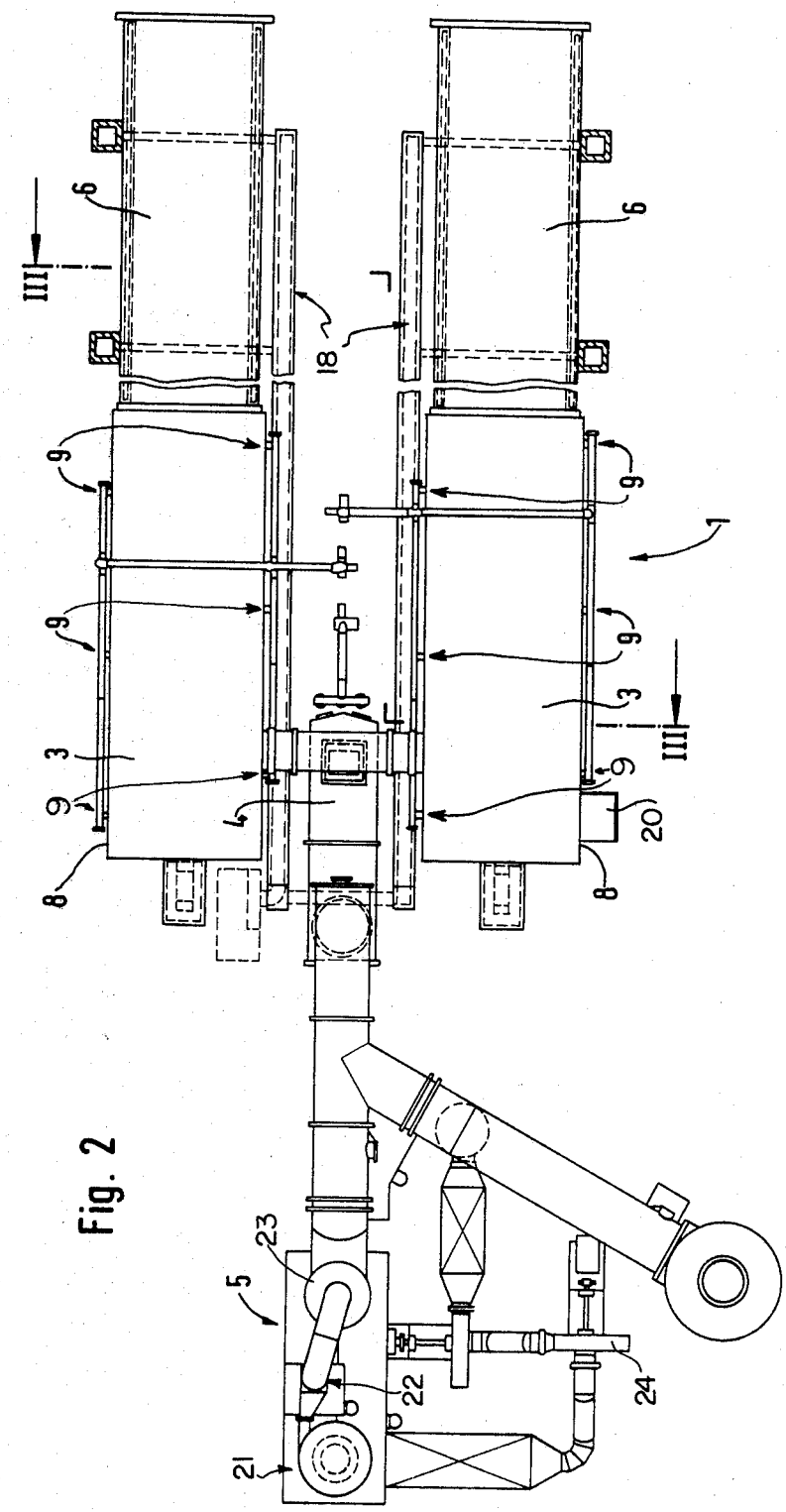
FIG. 2 is a top view of the installation according to FIG. 1.
Figure 3:
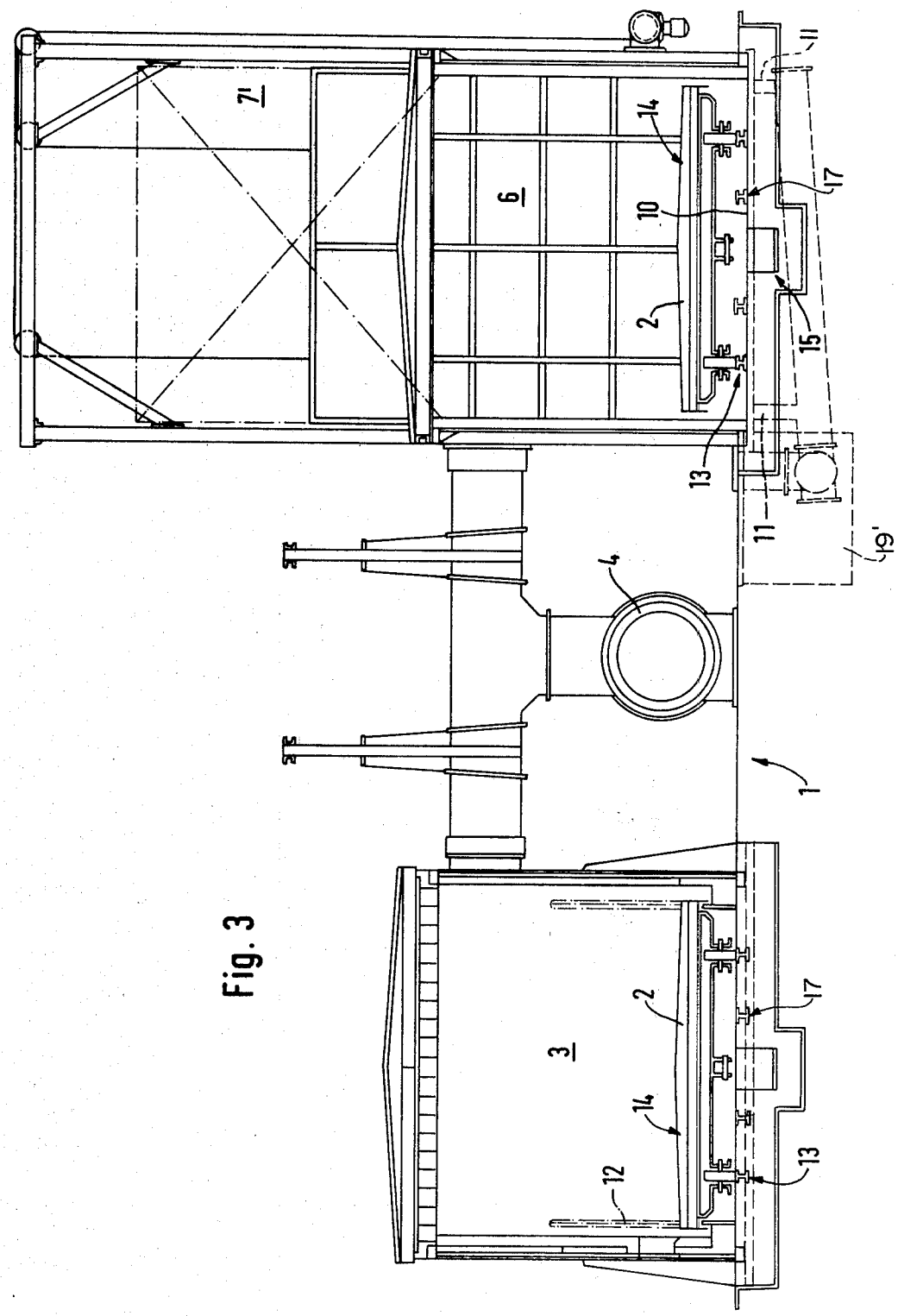
FIG. 3 is a cross-sectional view taken along the line III—III in FIG. 2.

An installation 1 for burning-out scrap metal according to the invention has two refractory furnace wagons 2, which can be filled with material to be burned-out, e.g., entire automobiles or rail wagons. It also includes two cooling chambers 6 arranged next to each other, in which the burned-out material can be cooled and cleaned by water spraying, and two burning-out chambers 3 connected at the front end to the cooling chambers 6, in which the material can be burned-out to scrap metal at about 640° C. A common afterburning chamber 4 is attached symmetrically to the burning-out chambers 3, in which the flue gases produced in the burning-out chambers 3 can be afterburned at about 1100° to 1200° C. A waste gas purification plant 5 is connected to the afterburning chamber 4, for the separation of the flue gas impurities and for the scrubbing and cooling of the flue gases, including the neutralization of the washing water. The dirty water is passed into a circular thickener 16 for the removal of solids.

The inside measurements of each of the two burning-out chambers 3 can be roughly 16 m in length, 4.6 m in width and 4.25 m in height, so that not only automobile wrecks but entire rail cars can be burned-out. The burning-out chambers 3 have a steel frame construction with a built-in suspended roof and a superposed rain roof. The masonry consists, from the inside toward the outside, of refractory firebricks resistant to changes in temperature, insulating clamps, an air chamber and brickwork. And of course this masonry forms the walls of the walls of the burning-out chambers 3. Each burning-out chamber has an electrically- or hydraulically-driven door 7 at the charging end, which is impervious to smoke and opens vertically. Bleeder valve explosion doors 19 in the upper part of the sidewalls 8 protect the installation against possible explosive surges. The burning-out chambers 3 are heated according to choice with six gas- or oil-burners 9, which can be regulated and switched on or off individually or en masse, according to need, in order to ensure an even temperature of from about 600° to 640° C. Solenoid and stop valves are provided for ignition and safety of the installation.

A protected monitoring room 20 with a control panel is situated outside the burning-out chambers 3, in which are installed all the instruments required for operation, such as push-buttons, blast regulators, power relays, combustion relays and temperature regulators including the master switch.

An opening is situated on the rear side of the burning-our chambers 3, through which the flue gas is sucked out from burning-out chambers 3 into the after-burning chamber 4.

The two burning-out chambers 3 can be alternately filled with material and alternately switched on to burn-out the contents. Each combustion chamber is to be pre-heated for about 30 minutes before the beginning of the operation, so that the first charging takes place at a standard temperature of about 600° C. The overall duration of the burning-out process is roughly 40 minutes.

The flue gases sucked from the burning-out chambers 3 are afterburned in the afterburning chamber 4 at about 1100° to 1200° C. The afterburning chamber 4 has an external diameter of 2200 mm with an inner width of 1400 mm and is 9 m long.

The inner casing of the afterburning chamber 4 is refractory lined, while the outer casing consists of heat-resistant steel. The contact temperature on the outside is thus 70° C. at the maximum.

A fully automatic electric temperature regulator with a constant signal output is provided for temperature regulation.

The flue gases pass, on leaving the afterburning chamber 4, via a connecting pipe into a waste gas purifying plant 5. In this plant the flue gas impurities are removed and the flue gases are cooled and cleaned.

The cooling chambers 6 are situated in front of the burning-out chambers 3, and have the following dimensions: 17 m length, 4.6 m inner width and 4.25 m inner height. The burned-out material is passed into these cooling chambers 6 immediately after being burned-out. The body of the cooling chambers 6 consists of a steel frame construction. The masonry consists of, from the inside to the outside, industrial sinter bricks and a layer of insulation material as well as rainproof roofing. Each cooling chamber has a smokeproof door 7' at the charging end, driven by electric chain hoists with a tractive power of 2500 kp each, opening vertically and with a maximum lifting height of 5 m. The lifting time is about 50 seconds.

A water-spraying installation is to be found in each of the cooling chambers 6 for the cooling and cleaning of the burned-out material. The dirty water flows from the waterproof concrete floor 10, which runs at a slope to the longitudinal axis of the chambers, to sewers 11. The latter is connected to a sewage-cleaning- and settling-tank 19'.

The cooling chambers 6 are also equipped with suction devices 8 for the steam which arises during cooling and cleaning. The steam thus removed is passed directly into the waste gas purifying plant 5.

The furnace wagons 2 each measure 15.6 m in length and 4.45 m in width, each having eight axles. In order to distribute the load as evenly as possible over all the axles, the supporting frames are divided into several parts. The covering, which consists of refractory fire-bricks, is separated only by expansion joints. The furnace wagon 2 has a double layer of high-quality insulation, which is protected against moisture by heat-resistant foils.

Vertical stakes 12 in a staggered arrangement at the sides of the wagon protect the material from falling.

The furnace wagons 2 run on rails 13 and are pulled by transport-chain made of strong 20 mm chain steel by way of electric motors. The furnace wagons 2 have a slight gradient 14 from the center to both the longitudinal sides. Gullies are situated on the longitudinal sides, in which melting metal can be gathered.

An inset U-rail 15 is situated in the ground for the chain-return. The part of the chain which lies on the floor of the burning-out chamber 3 as the furnace wagon 2 travels out is supplied with air-cooling.

Rails 17 with the standard gauge for railway wagons of 1435 mm can be laid parallel to the rails 13 for the furnace wagons 2, so that railway wagons can be driven on their own axles into the burning-out chambers 3, in order to be burned-out.

The waste gas purifying plant 5 can be constructed, according to choice, on the principle of supersonic free jet washers, either by means of steam jets or by a Venturi washer plant. The latter consists of a saturating device for cooling the flow of waste gas to the point of condensation, with an inner lining of bricks resistant to temperature, acids and alkalis, and including a complete water jet inlet system. A circulating pump unit is provided for the saturating device. The gas washing is effected by a heavy-duty Venturi washer 22 with a circulating pump unit. A separator 23 serves for the separation of the dirty water from the waste gas flow. A heavy-duty blower unit 24 is supplied with a waste gas flue for forcing through the flow of flue gas. In addition, the waste gas purifying plant 5 has a circulatory water tank 16. Waste gas purifying plants on the principle of supersonic free jet washers are known from the steel industry in the United States of America.

The electrical control unit includes especially the temperature safety for the protection of the rubberized construction units of the installation, the starting circuit for the ventilator motor, starting circuits for the pump motors, as well as all the switching signal and operating units, including the main switch.

The capacity of the installation is determined by the form of the burning-out chambers 3. Approximately 160 to 200 automobile wrecks can be processed in an 8 hour shift. Each burning-out chamber 3 is heated up for roughly 30 minutes, until the standard temperature of about 600° C. is reached. This happens before the beginning of production. The burning period of one loading of a burning-out chamber is between about 30 and 50 minutes according to the type of material loaded, the average being about 40 minutes.

The loading and unloading of the furnace wagon 2 for filling the burning-out chambers 3 lasts about 5 to 10 minutes. The furnace wagon 2 for the first filling can be loaded the previous day while the burning-out chamber 3 is being cleaned, or while the latter is being heated.

In each of the two burning-out chambers 3, 9 to 15 automobile wrecks (on the average 10 tons of material), according to magnitude, can be pushed in on the furnace wagon 2 at one loading. For each burning chamber 3 in an 8 hour shift, this means that about 100 tons of material are processed, and, after separation of the waste, about 75 tons of scrap, i.e., for the two burning-out chambers, about 150 tons of clean, high quality scrap per shift. The burning of 10 to 12 automobile bodies produces about 3 to 4.5 tons of combustible material, including about 1 ton of rubber and about 0.5 tons of polyvinylchloride, oil and paint, which are burned.

Processing of automobile wrecks has, up until now, faced the problem of the old tires, inner fittings, upholstery and such like, which make up roughly 25% of the entire weight of the wreck. For a given weight of 1000 kg per automobile wreck, this gives a waste of roughly 250 kg. Using the scrap burning installation according to the invention, a 1000 kg automobile wreck produces not more than about 1.5 kg of waste in the form of ashes from washed-out and filtered dust particles from the flue gas. With previous automobile scrap reclamation processes, the 250 kg of waste must be processed together with all the machines, whereas with the installation according to the invention, only the burned-out clean scrap needs to be prepared.

The wear and tear of the machines in which automobile wrecks of the same material have hitherto, with a large energy consumption, being broken up, is considerably greater than the wear and tear in the installation according to the invention, where no material has to be broken up.

The replacement or repair of worn parts demands frequent shutdowns of previous breaking plants. With the installation according to this invention, it is only necessary, at the end of the last burning session, to clean the burning-out chambers and to replace the filter from time to time. Moving parts can be overhauled during the times when the installation is naturally shut down.

Previous processes have required that old tires be removed manually from automobile wrecks. This problem does not arise with the installation according to the invention, since the tires are burned simultaneously.

In most automobile wrecks, petrol, oil and grease are to be found, which can lead to fires and explosions of greater or less intensity during the breaking up, as a result of the showers of sparks arising thereby. This danger of explosion is excluded with the installation according to the invention, since these materials do not explode in this case, but are vaporized by the intense heat.

The consumption of heating oil or gas, of electricity and water, as well as that of chemical additives for neutralizing the waste water, cannot be compared to the considerably higher energy consumption of other installations, the simultaneous processing of the 25% proportions of waste, the removal and disposal of the waste and tires, the manual preparation of the automobile wrecks to be treated, the wear and tear of the machines, the burden of noise and the danger of explosions.

The operating costs of the installation according to the invention are about 40% below those of shredder installations.

The scrap recovered by processing in the installation according to the invention is clean and of very good quality. In order to obtain the clean scrap free of foreign bodies, batteries (lead), generators including coils and small motors (copper) are removed, insofar as they have not already been removed from the wreck. The aluminum gathers in the gully of the furnace wagon 2 and is collected after the burnt-out wreck has been unloaded. The scrap produced by the installation according to the invention is a high quality, clean product with a low proportion of foreign bodies, in which tin is present only in traces, copper below 0.11%, chrome below 0.3% and a nickel and aluminum only in traces. Only the sulphurous substances contained in the steel itself are produced by the installation according to the invention.

The meassured value of the noise produced by the installation according to the invention is roughly 60 Phon (dB(A)) at a distance of about 20 m. Thus, it is considerably quieter than known installations.

The small quantities of waste produced by the treatment of scrap in the installation according to the invention are not dangerous and do not need to be stored in special dumps.

The possibility of air-pollution is excluded by the installation according to the invention, since the afterburning chamber 4 and the waste gas purifying plant 5 clean the flue gas to the extent that the official requirements regarding the degree of purity of waste gases can be complied with without difficulties. When measured, the waste gases contain, for example, 45 to 85 mg/m$^3$ fine dust, 30 to 50 mg/m$^3$ HCl, traces of $SO_2$ and traces of HF. The circulating water is driven at a pH value of 12. It is continuously clarified and replenished with fresh water. Should saturation occur towards the level of pH value 10, neutralization by addition of caustic soda is effected automatically. Pollution of ground water by the water flowing from the installation according to the invention thus cannot occur. The contents of various elements are below permissible levels.

Thus, the installation according to the invention is environmentally safe and economical. The mode of operation, which is explained in the above description of the installation, and the procedure for burning-out scrap, which is also to be protected, are extraordinarily simple.

What is claimed is:

1. An installation for burning-out scrap metal goods for the purpose of reclaiming scrap metal, comprising:
   (a) at least one furnace wagon, which is capable of being loaded with the scrap metal goods to be burned-out;
   (b) at least one burning-out chamber into which said furnace wagon is movable for burning-out the scrap metal goods to produce scrap steel;
   (c) means for heating said burning-out chamber to a temperature of at least about 600° C.;
   (d) at least one afterburning chamber communicating with said burning-out chamber for afterburning flue gases produced in the burning-out chamber at a temperature from about 1100° to 1200° C.;
   (e) a waste gas purifying plant communicating with said afterburning chamber for eliminating the flue gas impurities and for the scrubbing of the flue gases originating from the afterburning chamber;
   (f) at least one cooling chamber arranged adjacent to and in selective communication with said burning-out chamber for cooling the burned-out material, said cooling chamber being connected at the charging end of each burning-out chamber;
   (g) each of said burning-out chambers including a door which is arranged at the charging end and which seals so as to be impervious to smoke;
   (h) each of said heating means in each of said burning-out chambers comprising a plurality of selectively operable burners positioned along the length of said burning-out chamber;
   (i) a plurality of rails for driving said furnace wagons into the burning-out and cooling chambers; and
   (j) said furnace wagon having a floor, said floor having a slope leading from the center to both longitudinal sides, along which sides gullies are provided for catching melting metal.

2. An installation for burning out scrap metal goods according to claim 1, comprising two burning-out chambers, arranged next to each other, wherein said burning-out chambers are attached to one said afterburning chamber and one said waste gas purifying plant.

3. An installation for burning out scrap metal goods according to claim 1, wherein said door opens vertically.

4. An installation for burning out scrap metal goods according to claim 1, wherein each of said cooling chambers comprises a door which is arranged at the charging end and which seals so as to be impervious to smoke.

5. An installation for burning-out scrap metal goods according to claim 1, wherein each of said cooling chambers further comprises a suction device for removing steam.

6. An installation for burning out scrap metal goods according to claim 5, wherein the floors of each of said cooling chambers are waterproof and slope down at an angle to their longitudinal axis to a sewer.

7. An installation for burning out scrap metal goods according to claim 1, wherein each of said furnace wagons further comprise vertical stakes at the edges for holding the scrap metal goods.

8. An installation for burning out scrap metal goods according to claim 1, further comprising a second set of rails laid in said burning-out and cooling chambers, said second set of rails having normal gauge for railway wagons.

* * * * *